US006833833B1

(12) United States Patent
Lippincott

(10) Patent No.: US 6,833,833 B1
(45) Date of Patent: Dec. 21, 2004

(54) FEEDBACK PATH FOR VIDEO BENCHMARK TESTING

(75) Inventor: Louis A. Lippincott, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 09/671,515

(22) Filed: Sep. 26, 2000

(51) Int. Cl.⁷ ............................................ G06F 13/372
(52) U.S. Cl. ...................... 345/534; 345/536; 345/559; 345/629; 702/186; 386/94; 380/201
(58) Field of Search ................................. 345/501–506, 345/519, 520, 522, 530–574, 629, 531, 533, 534, 536, 559; 370/249; 348/180, 189; 380/200, 201; 386/94; 702/182, 183, 186, 189; 714/47

(56) References Cited

U.S. PATENT DOCUMENTS

| | | | | |
|---|---|---|---|---|
| 4,780,755 A | * | 10/1988 | Knierim | 348/180 |
| 5,227,863 A | * | 7/1993 | Bilbrey et al. | 358/22 |
| 5,530,483 A | * | 6/1996 | Cooper et al. | 348/518 |
| 5,574,500 A | * | 11/1996 | Hamada et al. | 348/180 |
| 5,615,358 A | * | 3/1997 | Vogley | 713/501 |
| 5,696,527 A | * | 12/1997 | King et al. | 345/634 |
| 6,137,952 A | * | 10/2000 | Hogan | 386/94 |
| 6,323,828 B1 | * | 11/2001 | Perez | 345/10 |
| 6,356,313 B1 | * | 3/2002 | Champion et al. | 348/558 |
| 6,393,504 B1 | * | 5/2002 | Leung et al. | 710/104 |
| 6,411,623 B1 | * | 6/2002 | DeGollado et al. | 370/395.1 |

\* cited by examiner

Primary Examiner—Ulka J. Chauhan
(74) Attorney, Agent, or Firm—Schwegman, Lundberg, Woessner & Kluth, P.A.

(57) ABSTRACT

A feedback path to the processor for a video signal in a computer. The video image data is not normally subjected to benchmark testing because it would make it susceptible to illegal copying. The digital video output signal is sent back to the processor one pixel at a time, with a delay between pixels equivalent to one line time. The result is that the pixel feed is so slow that digital copying is impractical. A lockout timer allows the pixel data to be sent to the processor only at intervals.

29 Claims, 1 Drawing Sheet

FEEDBACK PATH FOR VIDEO BENCHMARK TESTING

FIELD

The present invention is directed to a computer system having benchmark testing of the video signal and, more particularly, to a computer system having a feedback path for benchmark testing of the video signal while preventing illegal copying.

BACKGROUND

Computer systems are now in use which use benchmark programs to analyze the performance of the graphics function in the graphics controller. Thus, these benchmarks measure the speed and accuracy of the generated graphics on a three-dimensional basis. Such a system contains elements shown in FIG. 1. Computer system 10 includes a central processing unit 12 and a memory 14 which are interconnected. It also includes a graphics controller 16 which generates and controls the graphics which are displayed in monitor 18. The device also includes a frame buffer 20 which receives the graphics signal before display on the monitor 18. The frame buffer 20 is also connected to the processor 12 so that the graphics signal may be measured by the processor 12 and a programmed benchmarked system can be used to determine the speed and accuracy of the graphics signal.

In addition to the traditional graphics information to be displayed, computers also now have the ability of displaying video signals. This may be a video signal stored in memory, it may be a video signal which is received over an internet connection and stored in memory for later play or it may be a video signal received from a DVD ROM. Such signals whether played directly or stored in the memory for later play are handled differently than the graphics signals. An overlay block 22 is provided within the graphics controller 16 to receive and combine both the graphics and video signals. However, the video signal is not directly accessible by the processor 12 and, accordingly, it is not possible to perform a benchmark testing operation on the video signal. This means that it is not possible for the processor 12 to adjust the video signal to enhance its displayed appearance. It also does not provide a manner of testing the functionality of the system and so compare it to other systems.

The overlay block 22 reads video image data from the memory 14, scales the image and color converts the data for presentation to the digital-to-analog converter. However, this is no feedback path to the memory 14 or to the processor 12 from the overlay block 22. Thus, the overlay image data cannot be observed except on the monitor 18.

The main reason that this signal is not included in a feedback path is to make it more difficult to illegally copy the video signal. For example, if the video material is taken from a DVD ROM, the original provider of the ROM does not wish the signal to be available for illegal duplication. If the video signal were fed back to the processor 12 it would more likely be copied. By keeping the video signal hidden, illegal copying is extremely difficult. Unfortunately, it also makes it extremely difficult to perform benchmark testing to measure the quality of the video signal.

BRIEF DESCRIPTION OF THE DRAWINGS

The foregoing and a better understanding of the present system will become apparent from the following detailed description of example embodiments and the claims when read in connection with the accompanying drawings, all forming a part of the disclosure. While the foregoing and following written and illustrated disclosure focuses on disclosing example embodiments of the system, it should be clearly understood that the same is by way of illustration and example only and the system is not limited thereto. The spirit and scope of the present invention are limited only by the terms of the appended claims.

The following represents brief descriptions of the drawings, wherein.

DETAILED DESCRIPTION

Figure 1:
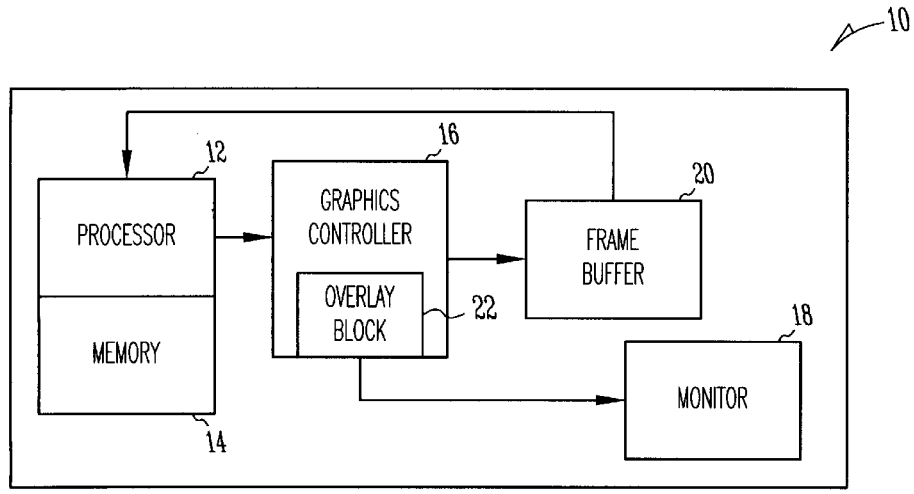
FIG. 1 shows an example disadvantageous computer system into which the present embodiment may be placed.

Before beginning a detailed description of the subject system, mention of the following is in order. When appropriate, like reference numerals and characters may be used to designate identical, corresponding or similar components in differing figure drawings.

Figure 2:
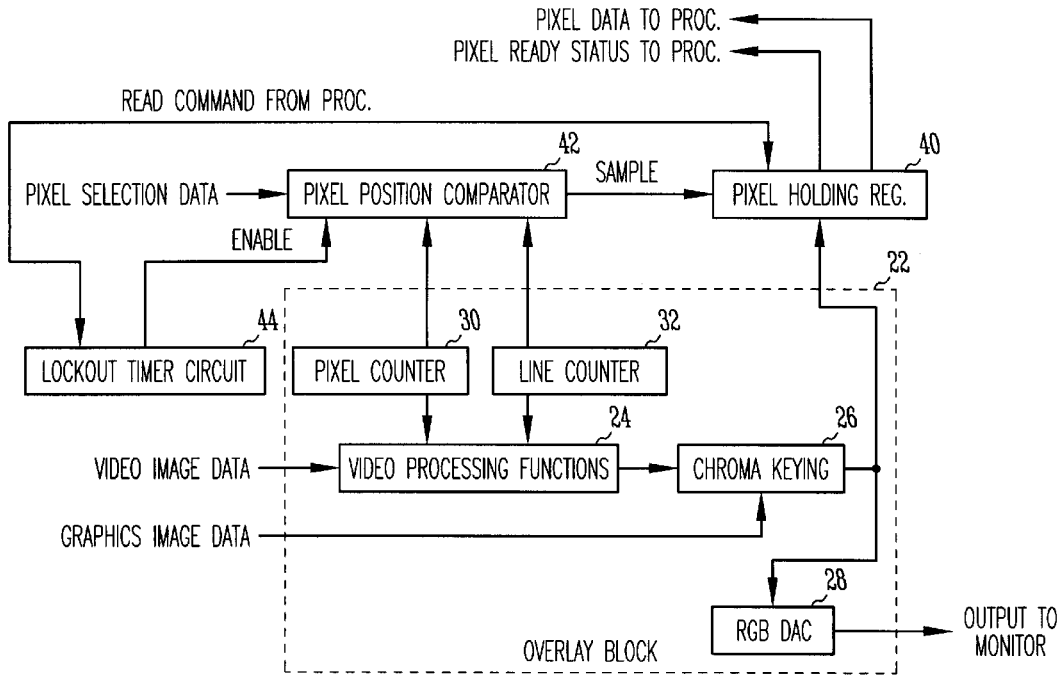
FIG. 2 is a schematic diagram showing the video overlay of FIG. 1 incorporating an example embodiment.

Referring now to the drawings, wherein like reference numerals designate identical or corresponding parts throughout the several views, and more particularly to FIG. 2 thereof, which show the overlay block 22 of the present embodiment. As in the prior art, the overlay block 22 receive the video image data and the graphics image data. As in the prior art, the video processing functions 24 and chroma keying 26 operate on the video and graphics image data and prepare the signal for output to a monitor 18. Before outputting the signal, the digital signal is converted to an analog signal in RGB digital-to-analog converter 28. The analog signals is are output to monitor 18 for display. A pixel counter 30 and line counter 32 are also present to keep track of the particular position of the displayed pixel in the video image. The pixel counter 30 and line counter 32 provide an indication of a position of the CRT beam during that particular pixel.

In addition to this structure which is normally present in an overlay block of the prior art, the present embodiment may provide additional structure to allow the video signal to be sent back to the processor for benchmark testing. A digital signal is taken from the input to the digital-to-analog converter 28 and held in pixel holding register 40. Once the pixel is ready to be read out of the pixel holding register 4Q, the pixel holding register 4Q sends a pixel ready status signal to the processor. Alternatively, this could be in the form of an interrupt signal or polled status arrangement. When the processor is ready to test the pixel signal, a read command is sent from the processor to the pixel holding register 40. The pixel data is then sent to the processor for benchmark testing.

A pixel position comparator 42 is also provided which receive the position of the displayed pixel from the pixel counter 30 and line counter 32. This actual position is compared with a pixel selection data signal from the processor which requests data from a particular selected pixel. When the pixel position comparator 42 finds a match, a signal is then sent to pixel holding register 40 to sample the digital signal at that point. The processor will select pixels in some type of sequence so that the entire picture is tested over a period of time.

As indicated above, however, there is a problem in the industry that the providers of video material do not want the video signal available for copying. By sending this pixel data to the processor, it makes it much easier for the video signal to be illegally copied. In order to make this pixel data unusable for copying, applicants have provided a lockout timer circuit 44 which receive the read command signal from the processor as it is sent to the pixel holding register 40. Upon receipt of the read command, the lockout timer circuit 44 will produce one enabling signal to allow the pixel position comparator 42 to forward the sampling signal to the pixel holding register 40. Alternatively, this enabling signal could go directly to the pixel holding register 40. In either case, the enabling signal allows the pixel signal to be read and forwarded to the processor.

The lockout timer circuit 44 includes a clock which then prohibits the lockout timer circuit 44 from forwarding another enable signal for a set amount of time. For example, an enabling signal can be produced at the end of each line of the video display. Since the video image is typically 720 pixels wide, this would mean that it would require passing 720 lines of video image to sample across a single line. Normally, if the video image is introduced at 60 Hz, it would then take 12 seconds to capture an entire video image. For the video quality analysis program, this spread of time is not too prohibitive. Thus, the processor could do a benchmark check every 12 seconds on an image which is fast enough to produce measurements and to control the quality of the video signal. However, this is slow enough that an illegal copier would be deterred from trying to steal the video signal. For example, if a DVD movie is played, it would take about 792 hours (33 days) to capture the entire movie in the decoded format. This is slow enough that copying is deterred.

While the enable signal from the lockout timer circuit 44 is correlated to the passage of a line of video image, it is also possible to utilize a time passage of a greater or lesser size. However, the size must be such that the capture of the video signal is slow enough to deter illegal copies. The time can be determined by an internal clock, or if it is correlated to an end-of-line signal or other internal signal, it could be taken directly from this signal.

Once the pixel data has been sent to the processor, it is possible to utilize an algorithm to measure different parameters of the video signal according to any number of performance measuring benchmark algorithms already available. For example, the video signal can be measured according to an algorithm called "Just Noticeable Difference" by the Sarnoff Corporation. Benchmark measuring programs determine not only the speed of the video, such as the number of frames per second and how fast it can draw circles, but also can now look at the quality of the picture itself to determine if it is fuzzy, if the colors are correct, whether there is accuracy in the decompression of the data and other quality performance benchmarks. This data can be used either for analysis and improvement of the circuit or it can be used directly in a feedback arrangement to control the video settings so as to improve the picture.

This concludes the description of the example embodiments. Although the present system has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

Further, in the detailed description to follow, example sizes/models/values/ranges may be given, although the present system is not limited to the same. As a final note, well known power/ground connections to ICs and other components may not be shown within the figures for simplicity of illustration and discussion, and so as not to obscure the invention. Further arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention will be described using an example system block diagram in an example personal computer (PC) environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

What is claimed is:

1. An apparatus comprising:
 a lockout device to prevent a processor from reading a video signal at a same rate as a display rate of the video signal, to receive a read command from a processor, to produce an enable signal in response to the read command, and to prevent another enable signal for a predetermined time; and
 a comparator to compare a selected pixel position signal from the processor with an actual pixel position signal from an overlay block, wherein the comparator is to send pixel data of the video signal to the processor in response to the comparison and the enable signal.

2. The apparatus according to claim 1, wherein the processor is to receive the pixel data for benchmark measuring.

3. The apparatus according to claim 1, wherein the lockout device is to allow an enable signal only once every line-time.

4. The apparatus according to claim 1, wherein the lockout device includes a timer.

5. The apparatus according to claim 1, further comprising a register to secure the pixel data from the overlay block and to store the pixel data upon receipt of the enable signal and the comparison.

6. The apparatus according to claim 5, wherein the register is to provide a status signal to the processor and to receive a read command from the processor.

7. The apparatus according to claim 5, wherein the register is to provide an interrupt signal to the processor and to receive a read command from the processor.

8. The apparatus according to claim 1, wherein the overlay block includes a video processing function to receive video image data, a chroma keying system to receive an output of the video processing function and an input of graphics image data, the output of the chroma keying structure to form the input to a digital-to-analog converter which is to form an analog output to a monitor.

9. A system comprising:
a processor;
a monitor;
a source of graphics image data;
a source of video image data;
an overlay block to receive the video image data and the graphics image data and to produce an input to a digital-to-analog converter, wherein the digital-to-analog converter produces an output to the monitor;
a lockout apparatus to receive a command signal from the processor and to produce an enable signal based on the command signal, wherein the enable signal is produced only once during a predetermined time; and
a comparator to compare a processor selected pixel position with an actual position of a CRT beam in the monitor to produce an output and to send digital pixel data at the processor selected pixel position to the processor in response to the compare and the enable signal, wherein the digital pixel data is retrieved from the input to the digital-to-analog converter.

10. The system according to claim 9, further comprising a register to store the digital pixel data upon receipt of the output from the comparator and the enable signal from the lockout apparatus.

11. The system according to claim 10, wherein the register is connected to the processor, and wherein the register is to send the stored digital pixel data to the processor for benchmark measuring.

12. The system according to claim 9, wherein the overlay block includes a video processing function device to receive the video image data and to scale the image, a chroma keying device to receive the output of the video processing function device and the graphic image data to color convert the data and the digital-to-analog converter to convert an output of the chroma keying device to an input to the monitor.

13. The system according to claim 9, wherein the lockout apparatus includes a timer.

14. The system according to claim 9, wherein the lockout apparatus is to allow the enable signal only once every line-time.

15. A method comprising:
comparing a selected pixel location with an actual pixel location;
producing an enable signal in response to a read command from a processor, wherein the enable signal is produced only once during a predetermined time period; and
sending pixel data of video image data to the processor in response to the comparing and the enable signal, wherein the pixel data is an input to a digital-to-analog converter.

16. The method according to claim 15, further comprising:
storing the pixel data in a register;
sending the stored pixel data to the processor; and
benchmark measuring the stored pixel data.

17. The method according to claim 16, wherein the video image data is benchmark measured at a rate slower than a display rate of the video image data.

18. The method according to claim 15, wherein the enable signal is produced only once every line-time.

19. A machine-readable medium that provides instructions, which when executed by a machine, cause said machine to perform operations comprising:
comparing a selected pixel location with an actual pixel location;
producing an enable signal in response to a read command from a processor wherein the enable signal is produced only once during a predetermined time period; and
sending pixel data from video image data to the processor when the selected pixel location matches the actual pixel location based on the comparison operation and when the enable signal is produced, wherein the pixel data is an input to a digital-to-analog converter.

20. The machine-readable medium according to claim 19 further comprising:
storing the pixel data in a register;
sending the stored pixel data to the processor; and
benchmark measuring the stored pixel data.

21. The machine-readable medium according to claim 20, wherein the video image data is benchmark measured at a rate slower than a display rate of the video image data.

22. An apparatus comprising:
a pixel holding register to store pixels from video data that are also to be outputted to a monitor through a digital-to-analog converter; and
a lockout timer circuit to lock retrieval per unit of time by a processor of a number of the pixels from the pixel holding register.

23. The apparatus according to claim 22, wherein the lockout timer circuit is to lock retrieval wherein the processor is able to retrieve a pixel from the pixel holding register once per line of an image.

24. The apparatus according to claim 22 comprising a comparator to compare a selected pixel position from the processor with an actual pixel position to be outputted to the monitor.

25. The apparatus of claim 24, wherein the processor is to perform a benchmark measure of the video data based on retrieval of the pixel from the pixel holding register when the comparator indicates that the selected pixel position equals the actual pixel position based on the compare operation and when the lockout timer circuit unlocks the retrieval.

26. A system comprising:
a processor to execute at least one instruction to cause a benchmark test of video image data, wherein the at least one instruction includes a request for a pixel of the video image data for which a benchmark test is to be performed;
a graphics controller coupled to receive the video image data, the graphics controller comprising:
an overlay block to process the video image data;
a pixel holding register to store a current pixel of the video image data that is processed by the overlay block;
a lockout timer circuit to receive the request for the pixel and, in response, to transmit an enable signal to the pixel holding register and to prevent a different enable signal to be transmitted to the pixel holding register for a predetermined time; and
a comparator to compare a position of the pixel being requested with a position of the current pixel, the comparator to cause the pixel to be sent to the processor if the position of the pixel being requested is the position of the current pixel and if the enable signal is received from the lockout timer circuit.

27. The system according to claim 26, wherein the overlay block includes a video processing function device to receive the video image data and to scale the image, a chroma keying device to receive the output of the video processing function device and the graphic image data to color convert the data and a digital-to-analog converter to convert an output of the chroma keying device to an input to the monitor.

28. The system according to claim 26, wherein the lockout timer circuit is to allow the enable signal to be transmitted to the pixel holding register only once every line-time.

29. The system according to claim 26, wherein the lockout timer circuit is to allow the enable signal to be transmitted to the pixel holding register only once every other line-time.

* * * * *